(12) United States Patent
Jung et al.

(10) Patent No.: US 9,225,540 B2
(45) Date of Patent: Dec. 29, 2015

(54) METHOD AND APPARATUS FOR RELAYING COMMUNICATION BETWEEN UNIVERSAL PLUG AND PLAY DEVICE AND REMOTE USER INTERFACE CLIENT

(75) Inventors: Dong-shin Jung, Suwon-si (KR); Won-seok Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 267 days.

(21) Appl. No.: 12/025,260

(22) Filed: Feb. 4, 2008

(65) Prior Publication Data

US 2009/0019058 A1    Jan. 15, 2009

(30) Foreign Application Priority Data

Jul. 11, 2007    (KR) .................. 10-2007-0069835

(51) Int. Cl.
*G06F 17/30* (2006.01)
*H04L 12/28* (2006.01)
*H04L 12/24* (2006.01)

(52) U.S. Cl.
CPC ........ *H04L 12/2809* (2013.01); *H04L 12/2814* (2013.01); *H04L 41/0213* (2013.01); *H04L 41/0809* (2013.01); *H04L 41/22* (2013.01); *H04L 12/281* (2013.01); *H04L 2012/2849* (2013.01)

(58) Field of Classification Search
CPC .................. H04L 12/2809; H04L 12/281
USPC .......................................... 707/600; 709/203
See application file for complete search history.

(56) References Cited

U.S. PATENT DOCUMENTS

| 6,182,094 | B1 * | 1/2001 | Humpleman et al. ... 707/999.01 |
| 2002/0029256 | A1 * | 3/2002 | Zintel et al. .................. 709/218 |
| 2006/0143295 | A1 | 6/2006 | Costa-Requena et al. |
| 2006/0153072 | A1 | 7/2006 | Bushmitch et al. |
| 2008/0205419 | A1 * | 8/2008 | Shin et al. ..................... 370/401 |

FOREIGN PATENT DOCUMENTS

| EP | 1742153 A1 | 1/2007 |
| JP | 2005109735 A | 4/2005 |
| KR | 1020050079480 A | 8/2000 |
| WO | WO 2007004754 A1 | 8/2005 |

OTHER PUBLICATIONS

"ANSI/CEA Standard. Web-based Protocol and Framework for Remote User Interface on UPNP Networks and the Internet (WEB4CE)", Internet Citation, Dec. 2006, XP002431656.
Communication dated Dec. 14, 2011 issued by the European Patent Office in counterpart European Patent Application No. 08722321.9.

(Continued)

*Primary Examiner* — Vincent F Boccio
(74) *Attorney, Agent, or Firm* — Sughrue Mion, PLLC

(57) ABSTRACT

Provided is are method of relaying communication between a remote user interface (RUI) client and a universal plug and play (UPnP) device in a home network. The method includes: searching for a UPnP action mapped to an RUI element corresponding to an RUI control message received from an RUI client,; generating a simple object access protocol (SOAP) message for calling a found UPnP action; and transmitting the SOAP message to the UPnP device.

11 Claims, 7 Drawing Sheets

(56) References Cited

OTHER PUBLICATIONS

Communication dated Dec. 5, 2011 issued by the Korean Intellecutal Property Office in counterpart Korean Patent Application No. 10-2007-0069835.

Communication dated Feb. 16, 2012 issued by the State Intellectual Property of P.R. China in counterpart Chinese Patent Application No. 200880024193.7.

Dees W, et al: "WEB4CE: Accessing Web-based Applications on Consumer Devices", Internet Citation, 2007, pp. 1303-1304, XP002431655.

Communication dated Sep. 15, 2011 from the State Intellectual Property Office of P.R. China in counterpart Chinese application No. 200880024193.7.

Dong Hee Kim, et al.; "A UPnP Proxy System for the Remote Control of Home Appliances"; Aug. 2004; pp. 337-350.

Korean Office Action dated Jul. 26, 2011 from the Korean Intellectual Property Office in corresponding Korean Patent Application No. 10-2007-0069835.

Mexican Office Action dated Jul. 14, 2011 from the Mexican Patent Office in corresponding Mexican Patent Application No. 2010/000420.

* cited by examiner

FIG. 8A

```xml
<?xml version="1.0" encoding="UTF-8"?>
<scpd xmlns="urn:schemas-upnp-org:service-1-0">
<specVersion>
    <major>1</major>
    <minor>0</minor>
</specVersion>
    <actionList>

...

<action>
        <name>GetStateUpdateID</name>
        <argumentList>
            <argument>
                <name>Id</name>
                <direction>out</direction>
                <relatedStateVariable>
                    StateUpdateID
                </relatedStateVariable>
            </argument>
        </argumentList>
    </action>

...

</actionList>
</scpd>
```

FIG. 8B

```
<CE-HTML>
<body>
    ...
    <a href="http://192.168.1.20:5200/control?action=GetStateUpdateID">GetStateUpdateID</a>
    ...
</body>
</CE-HTML>
```

FIG. 8C

```
POST path of control URL HTTP/1.1
HOST: host of control URL:port of control URL
CONTENT-LENGTH: bytes in body
CONTENT-TYPE: text/xml; charset="utf-8"
SOAPACTION: "urn:schemas-upnp-org:service:serviceType:v#actionName"

<s:Envelope xmlns: s="http://sChemas.xmlsoap.org/soap/envelope"
 s:encodingStyle="http://schemas.xmlsoap.org/soap/encoding">
<s:Body>
    <u:GetStateUpdateID xmlns:u="urn:schemas-upnp-org:service:serviceType:v">
        <argumentName>in arg value</argumentName>
        other in args and their values go here, if any
    </u:GetStateUpdateID>
</s:Body>
</s:Envelope>
```

METHOD AND APPARATUS FOR RELAYING COMMUNICATION BETWEEN UNIVERSAL PLUG AND PLAY DEVICE AND REMOTE USER INTERFACE CLIENT

CROSS-REFERENCE TO RELATED PATENT APPLICATION

This application claims priority from Korean Patent Application No. 10-2007-0069835, filed on Jul. 11, 2007 in the Korean Intellectual Property Office, the disclosure of which is incorporated herein in its entirety by reference.

BACKGROUND OF THE INVENTION

1. Field of the Invention

Methods and apparatuses consistent with the present invention relate to a home network, and more particularly, to relaying communication between a remote user interface (RUI) client and a universal plug and play (UPnP) device in a home network.

2. Description of Related Art

Home network devices are classified into controlled devices and controlling devices for controlling themselves or other devices.

In order for users to control devices belonging to a home network, protocols are essentially defined between devices in advance, and users necessarily require user interfaces (UIs).

UIs are classified into predefined UIs that are specialized for controlled devices and are previously informed of by controlling devices, and remote UIs that are provided to controlling devices by controlled devices as UIs of controlled devices, according to UI providers.

FIG. 1A is a diagram for explaining a method of controlling a UPnP media server using a universal plug and play (UPnP) control point (CP). Referring to FIG. 1A, the UPnP CP provides a user with a previously defined UI so that the user controls the UPnP media server via the UI provided by the UPnP CP and uses content of the UPnP media server.

FIG. 1B is a diagram for explaining a method of controlling a remote user interface (RUI) server by using a RUI client. CEA-2014, expandable home theater (XHT), widget description exchange service (WiDeX), remote desktop protocol (RDF) and the like are widely used RUI technologies.

Referring to FIG. 2, if devices are controlled based on RUI technologies, a remote UI (RUI) server sends a UI necessary for controlling the RUI server to an RUI client to perform controlling. According to RUI technologies, an RUI for RUI server devices can be brought from an external server.

In accordance with related art technologies, all devices in a home network must have RUI capabilities. In more detail, as shown FIG. 2, if a UPnP media server and an RUI server coexist in the same home network, since the UPnP media server does not have RUI capability, an RUI client cannot obtain UI for controlling the UPnP media server. Therefore, the user cannot control devices in the UPnP media server by using the RUI client.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method of relaying communication between an RUI client and a UPnP device in a home network.

According to an aspect of the present invention, there is provided a method of relaying communication between an RUI client and a UPnP device in a home network, the method comprising: if an RUI control message is received from an RUI client, searching for a UPnP action mapped to an RUI element corresponding to the RUI control message; generating a simple object access protocol (SOAP) message for calling a found UPnP action; and transmitting the SOAP message to the UPnP device.

The method may further comprise: collecting Descriptions of UPnP devices in the home network; mapping predetermined RUI elements to actions of the UPnP devices by referring to the collected Descriptions; generating RUI data of the RUI client by using the RUI elements; and transmitting the RUI data to the RUI client.

The method may further comprise: receiving a message in response to the SOAP message from the UPnP device; generating RUI update information for updating an RUI of the RUI client based on the received message; and transmitting the RUI update information to the RUI client.

The RUI data may be a consumer electronics (CE)-hypertext markup language (HTML) page.

The RUI elements may be at least one of buttons, text boxes, icons, anchors, and bitmap regions.

According to another aspect of the present invention, there is provided a computer readable recording medium having recorded thereon a computer program for executing the relaying method.

According to another aspect of the present invention, there is provided an apparatus for relaying communication between an RUI client and a UPnP device in a home network, the method comprising: a searching unit, if an RUI control message is received from an RUI client, searching for a UPnP action mapped to an RUI element corresponding to the RUI control message; and a UPnP controller generating an SOAP message for calling a found UPnP action, and transmitting the SOAP message to the UPnP device.

The apparatus may further comprise: a Description collecting unit collecting descriptions of UPnP devices in the home network; a mapping unit mapping predetermined RUI elements to actions of the UPnP devices by referring to the collected Descriptions; and an RUI providing unit generating RUI data of the RUI client by using the RUI elements, and transmitting the RUI data to the RUI client.

BRIEF DESCRIPTION OF THE DRAWINGS

The above and other aspects of the present invention will become more apparent by describing in detail exemplary embodiments thereof with reference to the attached drawings in which:

FIGS. 8A through 8C are diagrams of a UPnP description, RUI data, and a simple object access protocol (SOAP) message according to an exemplary embodiment of the present invention.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1A:
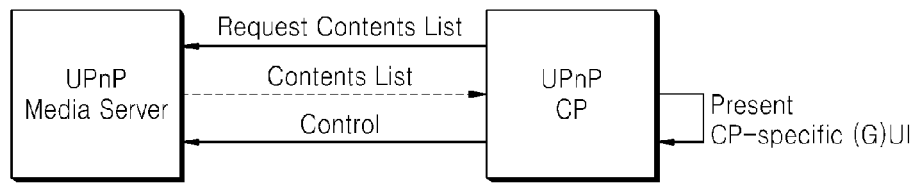
FIGS. 1A and 1B are diagrams for explaining a related art method of controlling a UPnP media server using a UPnP CP.
Figure 1B:
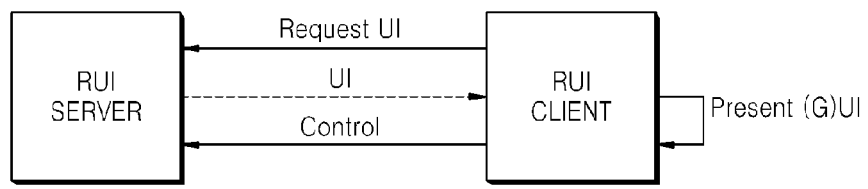
Figure 2:
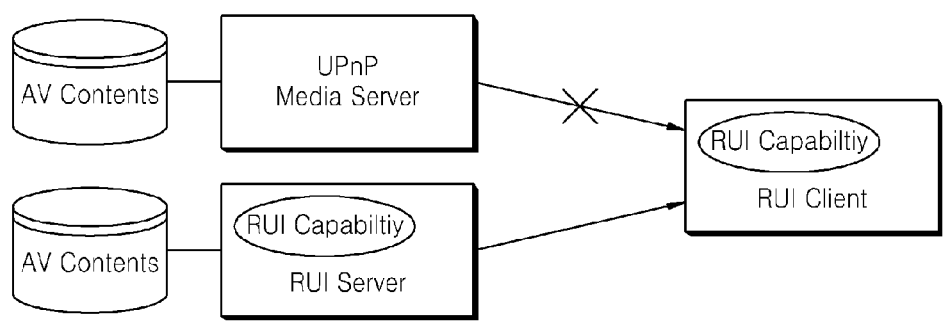
FIG. 2 is a diagram for explaining a problem of the related art.
Figure 3:
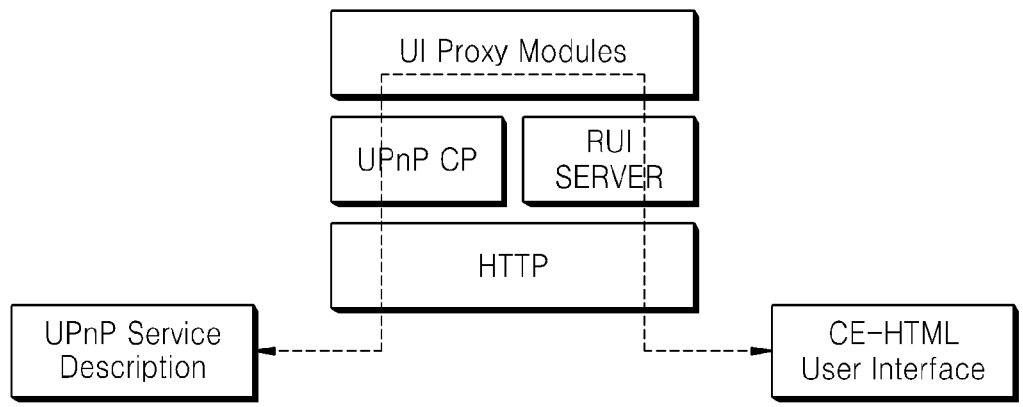
FIG. 3 is a functional diagram of an apparatus according to an exemplary embodiment of the present invention.

FIG. 3 is a functional diagram of an apparatus according to an exemplary embodiment of the present invention. Hereinafter, an apparatus for relaying communication between a UPnP device and an RUI client is referred to as an RUI proxy apparatus.

Referring to FIG. 3, the RUI proxy apparatus comprises a UPnP CP and an RUI server.

In more detail, a UPnP CP module transmits a simple object access protocol (SOAP) message for controlling a UPnP device and receives a message in response to the SOAP message. An RUI server module transmits RUI data to the RUI client, and receives a control message by using the RUI from the RUI client.

UI proxy modules convert between a UPnP service description document used in the UPnP device and the RUI data (e.g., consumer electronics (CE)-hypertext markup language (HTML)) used in the RUI client, in order to provide an environment in which the RUI client can control the UPnP device through the RUI. That is, UI proxy modules provide the RUI client with the RUI for controlling the UPnP device so that the RUI client recognizes the UPnP device as the RUI server. This will be described in more detail later.

A hypertext transfer protocol (HTTP) is used to communicate the UPnP device and the RUI client.

Figure 4:
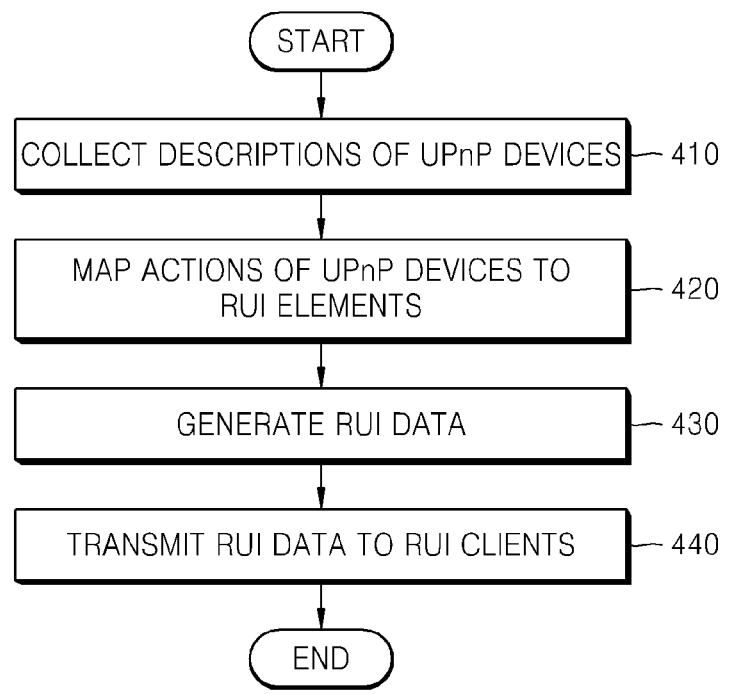
FIG. 4 is a flowchart illustrating a method of providing an RUI client with RUI data, wherein the method is performed by an RUI proxy apparatus, according to an exemplary embodiment of the present invention.

FIG. 4 is a flowchart illustrating a method of providing an RUI client with RUI data, wherein the method is performed by an RUI proxy apparatus, according to an exemplary embodiment of the present invention. Referring to FIG. 4, in Operation 410, the RUI proxy apparatus performs UPnP discovery and description so as to collect descriptions of UPnP devices belong to a home network.

In Operation 420, actions provided by the UPnP devices are mapped to RUI elements referring to the descriptions of the UPnP devices. The RUI elements are a part of the RUI data and tools for controlling an RUI server. For example, the RUI elements are text boxes, icons, anchors, bitmap regions, or the like. A user inputs a command in person through a text box, clicks an icon, clicks an anchor, or clicks a specific bitmap region in order to control the RUI server.

In Operation 430, the RUI proxy apparatus generates the RUI data using the RUI elements that are mapped to the UPnP actions. For example, the RUI data may be a CE-HTML page. CE-HTML is a markup language defined by the Consumer Electronics Association (CEA) standard (CEA 2014).

In Operation 440, the RUI proxy apparatus transmits the RUI data to the RUI client.

Figure 5:
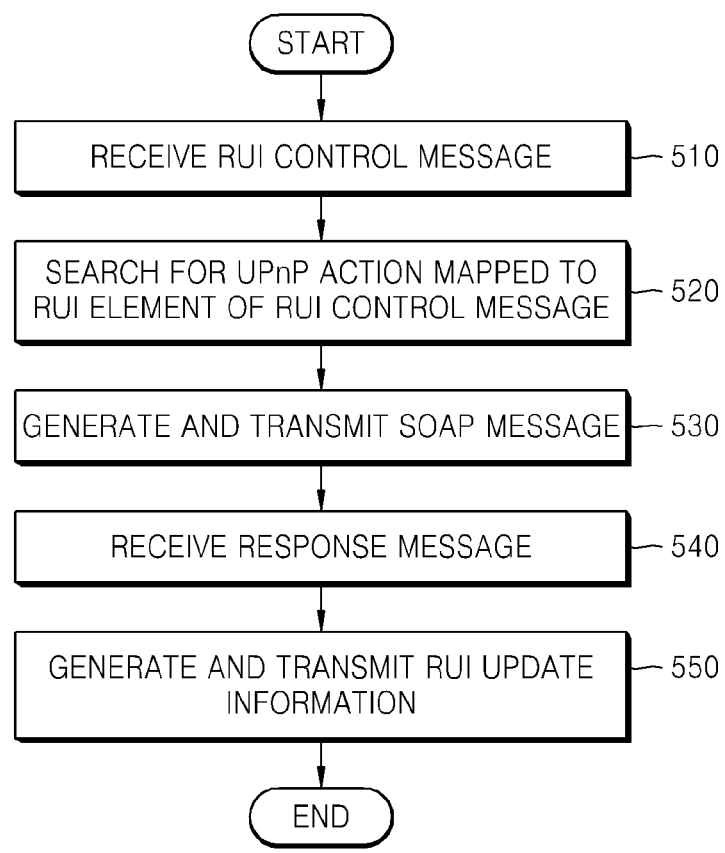
FIG. 5 is a flowchart illustrating a method of controlling a UPnP device according to a control message of an RUI client, wherein the method is performed by an RUI proxy apparatus, according to an exemplary embodiment of the present invention.

FIG. 5 is a flowchart illustrating a method of controlling a UPnP device according to a control message of an RUI client, wherein the method is performed by an RUI proxy apparatus, according to an exemplary embodiment of the present invention. Referring to FIG. 5, the RUI client controls the UPnP device by using an RUI obtained by the method of the previous exemplary embodiment illustrated FIG. 4.

In Operation 510, the RUI proxy apparatus receives a control message by using the RUI from the RUI client. The control message is transmitted to the RUI proxy apparatus after a user selects a specific RUI element from a UI provided by the RUI client.

In Operation 520, a UPnP action that is mapped to an RUI element of the control message is searched for. A mapping operation was performed in Operation 420 shown in FIG. 4.

In Operation 530, an SOAP message for calling the UPnP action is generated and is transmitted to the UPnP device.

In Operation 540, a message in response to the SOAP message is received from the UPnP device.

In Operation 550, the RUI proxy apparatus generates RUI update information for updating RUI data of the RUI client based on the received message, and transmits the RUI update information to the RUI client.

Figure 6:
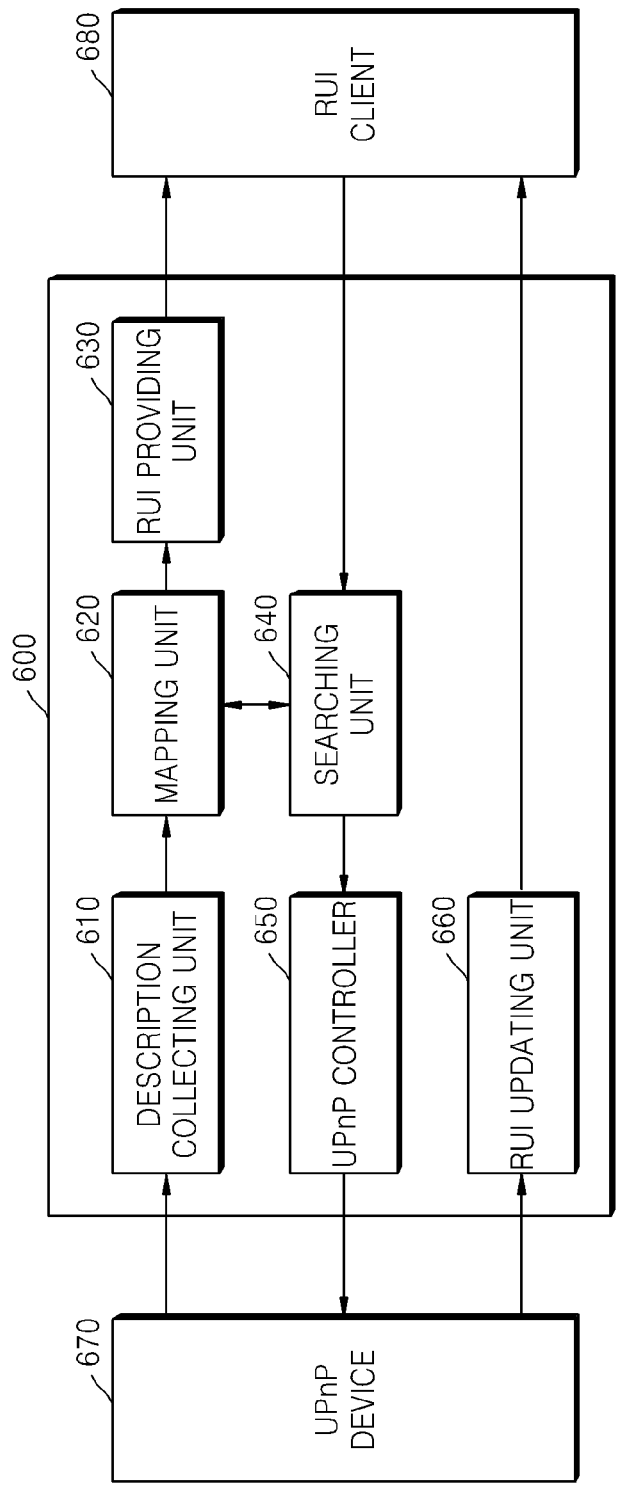
FIG. 6 is a block diagram of an RUI proxy apparatus according to an exemplary embodiment of the present invention.

FIG. 6 is a block diagram of an RUI proxy apparatus 600 according to an exemplary embodiment of the present invention. Referring to FIG. 6, the RUI proxy apparatus 600 comprises a description collecting unit 610, a mapping unit 620, an RUI providing unit 630, a searching unit 640, a UPnP controller 650, and an RUI updating unit 660.

The description collecting unit 610 receives an advertisement message of a UPnP device 670 and collects a description of the UPnP device 670. In the present exemplary embodiment, although a single UPnP device is provided, all descriptions of UPnP devices in a home network may be collected.

The mapping unit 620 maps actions provided by the UPnP device 670 to predetermined RUI elements based on the collected description. As described above, the RUI elements can be text boxes, icons, anchors, bitmap regions, or the like. Therefore, mapping information on each RUI element presenting the actions of the UPnP device 670 is generated and is stored in a memory (not shown).

The RUI providing unit 630 generates RUI data using the UPnP elements mapped to the UPnP actions and transmits the RUI data to an RUI client 680. Since the RUI client 680 recognizes the UPP device 670 as an RUI server requiring a separate RUI, the RUI providing unit 630 needs to generate the RUI data of each of UPnP devices.

The searching unit 640 receives a control message, i.e., a message for controlling an RUI server, using the RUI from the RUI client 680, and searches for a UPnP action that is mapped to the control message referring to the mapping unit 620.

The UPnP controller 650 generates an SOAP message for calling the found UPnP action and transmits the SOAP message to the UPnP device 670.

If the UPnP device 670 transmits a message in response to the SOAP message, the RUI updating unit 660 generates RUI update information using output parameters of the message in response to the SOAP message, and transmits the RUI update information to the RUI client 680. The RUI update information is used to update the RUI data of the RUI client. For example, if the UPnP device 670 is a UPnP media server, and the called action is browsers, the RUI updating unit 660 generates tags for making a content list of the UPnP media server on a CE-HTML page that is the RUI data of the RUI client 680 based on the output parameters of the message. The tags are transmitted to the RUI client 680. The RUI client 680 updates the CE-HTML page using the tags.

Figure 7:
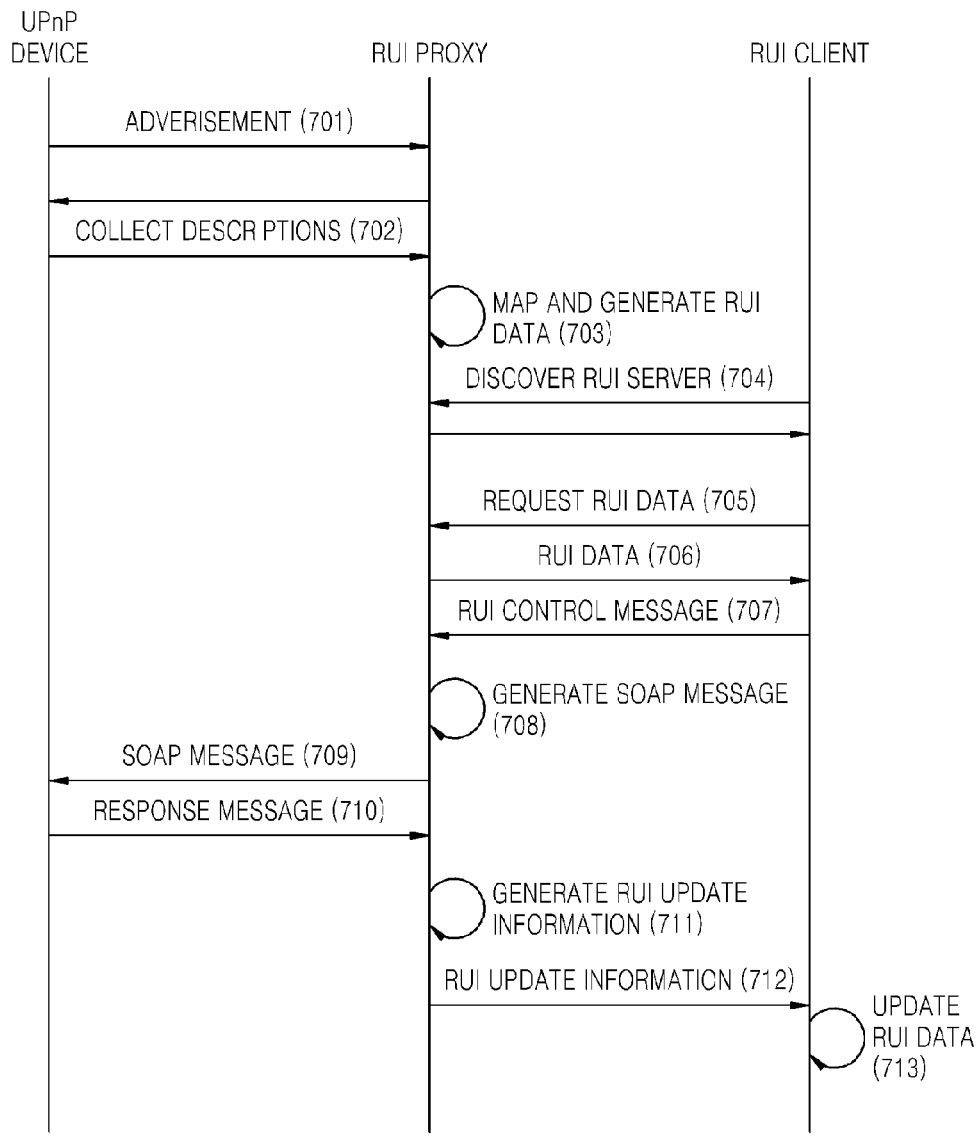
FIG. 7 is a flowchart illustrating a method of relaying communication between a UPnP device and an RUI client according to an exemplary embodiment of the present invention.

FIG. 7 is a flowchart illustrating a method of relaying communication between a UPnP device and an RUI client according to an exemplary embodiment of the present invention. Referring to FIG. 7, in Operation 701, the UPnP device broadcasts an advertisement message to a home network.

In Operation 702, an RUI proxy apparatus that receives the advertisement message collects a description of the UPnP device. That is, the RUI proxy apparatus functions as a UPnP CP in Operations 710 and 720. The UPnP CP is not specialized for any specific UPnP device but collects all descriptions of UPnP devices in a home network.

In Operation 703, the RUI proxy apparatus maps RUI elements to actions of the UPnP device based on the UPnP description, and generates RUI data using the RUI elements.

In Operation 704, the RUI client discovers an RUI server. The RUI client transmits a search message and receives a message in response to the search message in order to discover the RUI server. For example, when the RUI client transmits the search message such as M-Search, a device type is designated as the RUI server in the search message. The RUI proxy apparatus generates virtual RUI servers according to the number of UPnP devices. Each virtual RUI server responds to the search message of the RUI client. That is, in Operation 704, the RUI client discovers the virtual RUI server.

In Operation 705, the RUI client requests the RUI data from the UPnP device, i.e., the virtual RUI server.

In Operation 706, the RUI proxy apparatus transmits the RUI data to the RUI client.

In Operation 707, the RUI client generates an RUI control message based on the RUI data, and transmits the RUI control message to the RUI server. The RUI server is a virtual RUI server included in the RUI proxy apparatus. The RUI control message transmitted from the RUI client is generated after a user selects a specific RUI element using the RUI.

In Operation 708, the RUI proxy apparatus searches for the UPnP action mapped to the RUI element corresponding to the RUI control message, and generates an SOAP message for calling an action corresponding to the found UPnP action.

In Operation 709, the RUI proxy apparatus transmits the SOAP message to the UPnP device. In Operation 720, the RUI proxy apparatus receives a message in response to the SOAP message from the UPnP device. That is, the UPnP device recognizes the RUI proxy apparatus as a UPnP CP.

In Operation 711, the RUI proxy apparatus generates RUI update information based on the message received from the UPnP device.

In Operation 712, the RUI proxy apparatus transmits the RUI update information to the RUI client.

In Operation 713, the RUI client updates RUI data thereof by referring to the RUI update information.

FIGS. 8A through 8C are diagrams of a UPnP description, RUI data, and an SOAP message according to an exemplary embodiment of the present invention. It is assumed that a description of a UPnP device collected by an RUI proxy apparatus of the present invention is the same as shown in FIG. 8A. Referring to FIG. 8A, a UPnP device provides an action "GetStateUpdateID".

If RUI data is a CE-HTML page, the RUI proxy apparatus maps the action "GetStateUpdateID" to an anchor "Get stateupdate ID", generates RUI data shown in FIG. 8B, and transmits the RUI data to an RUI client.

If a user clicks the anchor "Get stateupdate ID" from a UI of the RUI client, an RUI control message is transmitted to the RUI proxy apparatus by the mapped anchor. The RUI proxy apparatus generated an SOAP message shown in FIG. 8C, and transmits the SOAP message to the UPnP device, in order to call the action "GetStateUpdateID".

According to the exemplary embodiments of the present invention, an RUI client can be used to control UPnP devices in a home network. Various UIs of UPnP devices are provided to the RUI client through RUI data generated by a single RUI proxy apparatus, so that a user can control UPnP devices having their own UI by using a consistent UI.

Also, the data structure used in the exemplary embodiments of the present invention described above can be recorded on a computer readable recording medium via various means.

Examples of the computer readable recording medium include magnetic storage media (e.g., ROM, floppy disks, hard disks, etc.), and optical recording media (e.g., CD-ROMs, or DVDs).

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of relaying communication between a remote user interface (RUI) client and a universal plug and play (UPnP) device in a home network, the method comprising:
    searching, by a relaying apparatus, for a UPnP action mapped to an RUI element corresponding to an RUI control message which is received from an RUI client for controlling the UPnP device;
    generating, by the relaying apparatus, a simple object access protocol (SOAP) message for calling the UPnP action found as a result of the searching;
    transmitting, by the relaying apparatus, the SOAP message to the UPnP device;
    collecting, by the relaying apparatus, Descriptions of UPnP devices in the home network;
    mapping, by the relaying apparatus, RUI elements to actions of the UPnP devices by referring to the Descriptions which are collected;
    generating, by the relaying apparatus, RUI data of the RUI client based on the RUI elements; and
    transmitting, by the relaying apparatus, the RUI data to the RUI client,
    wherein the RUI client is a control point in accordance with an RUI protocol that is not a UPnP protocol.

2. The method of claim 1, further comprising:
    receiving a message in response to the SOAP message from the UPnP device;
    generating RUI update information for updating an RUI of the RUI client based on the received message; and
    transmitting the RUI update information to the RUI client.

3. The method of claim 1, wherein the RUI data is a consumer electronics -hypertext markup language page.

4. The method of claim 3, wherein the RUI elements are at least one of buttons, text boxes, icons, anchors, and bitmap regions.

5. A computer readable recording medium having recorded thereon a computer program for executing the method of claim 1.

6. An apparatus for relaying communication between an remote user interface (RUI) client and a universal plug and play (UPnP) device in a home network, the apparatus comprising:
- a searching unit which searches for a UPnP action mapped to an RUI element corresponding to an RUI control message received from an RUI client;
- a UPnP controller generating a simple object access protocol (SOAP) message for calling the UPnP action which is found as a result of the searching by the searching unit, and transmits the SOAP message to the UPnP device;
- a Description collecting unit which collects descriptions of UPnP devices in the home network;
- a mapping unit which maps RUI elements to actions of the UPnP devices by referring to the Descriptions which are collected by the Description collecting unit; and
- an RUI providing unit which generates RUI data of the RUI client based on the RUI elements, and transmits the RUI data to the RUI client,
- wherein at least one of the searching unit and the UPnP controller is implemented as a hardware component,
- wherein the RUI client is a control point in accordance with an RUI protocol that is not a UPnP protocol.

7. The apparatus of claim 6, further comprising: an RUI updating unit which, if a generates RUI update information for updating an RUI of the RUI client based on a message received response to the SOAP message from the UPnP device, and transmits the RUI update information to the RUI client.

8. The apparatus of claim 6, wherein the RUI data is a consumer electronics - hypertext markup language page.

9. The apparatus of claim 8, wherein the RUI elements are at least one of buttons, text boxes, icons, anchors, and bitmap regions.

10. The method of claim 1, wherein the RUI control message is in accordance with the RUI protocol that is different from a UPnP protocol.

11. The method of claim 1, wherein another RUI control message for controlling a controlled device of the home network, distinct from the UPnP device, is transmitted to the controlled device without being converted by the relaying apparatus into the SOAP message when the controlled device is an RUI controlled device in accordance with the RUI protocol.

* * * * *